May 16, 1950  S. NOBLE  2,507,926
MULTIPLE CAMERA

Filed July 14, 1948  3 Sheets-Sheet 1

INVENTOR.
Samuel Noble
BY
Andrew K. Foulds
his ATTORNEY

May 16, 1950          S. NOBLE          2,507,926

MULTIPLE CAMERA

Filed July 14, 1948          3 Sheets-Sheet 2

INVENTOR.
Samuel Noble
BY Andrew K. Foulds
his ATTORNEY

May 16, 1950        S. NOBLE        2,507,926
MULTIPLE CAMERA
Filed July 14, 1948        3 Sheets-Sheet 3
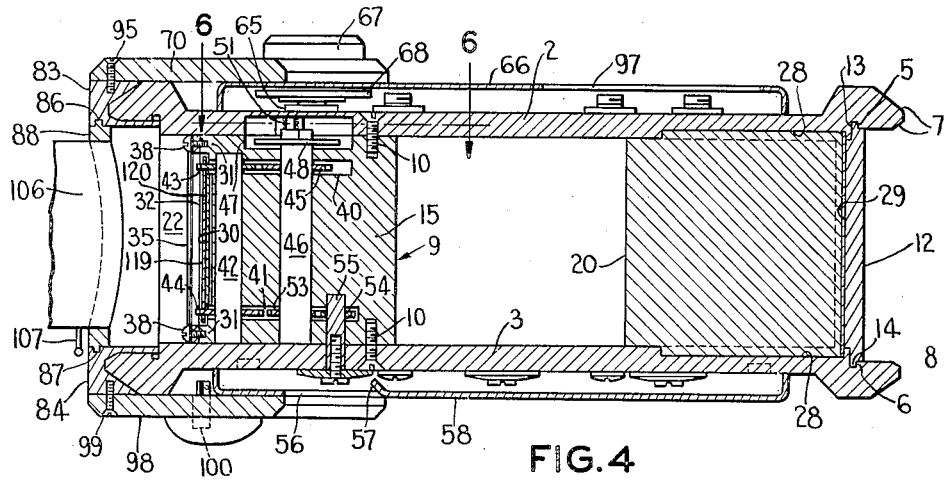
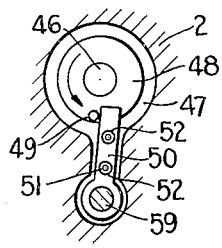
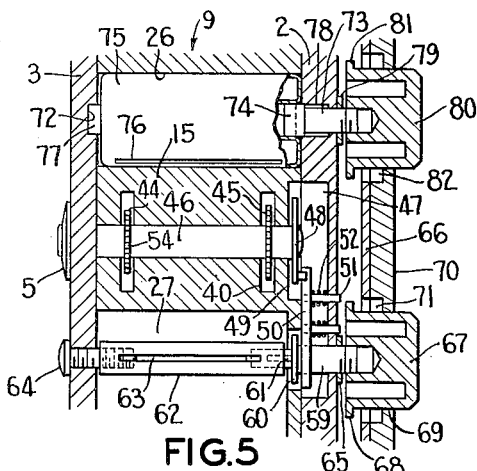
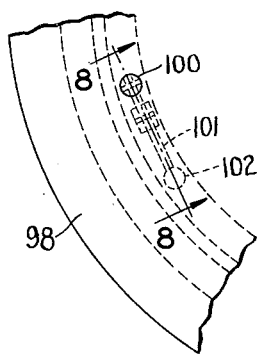
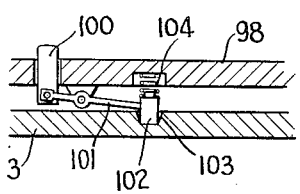
INVENTOR.
Samuel Noble
BY
Andrew K. Fowler
his ATTORNEY Patented May 16, 1950

2,507,926

UNITED STATES PATENT OFFICE 2,507,926

MULTIPLE CAMERA

Samuel Noble, Detroit, Mich.

Application July 14, 1948, Serial No. 38,635

13 Claims. (Cl. 95—34)

1

This invention relates to new and useful improvements in photographic cameras and more particularly to a multiple type camera.

An object is to provide a camera by which different kinds or types of light sensitive or emulsion material can be ready at hand for interchangeable exposure or picture-taking.

Another object is to provide a multiple film or emulsion material camera in or by which the various types of material may be selectively exposed while utilizing a single shutter and lens device.

Other objects will be apparent from the following detailed description.

The invention consists in the improved combination and cooperative relation of parts to be more fully described hereinafter and the novelty of which will be particularly pointed out and distinctly claimed.

In the accompanying drawings to be taken as a part of this specification, there is fully and clearly illustrated a preferred embodiment of the invention, in which drawings—

Figure 1:
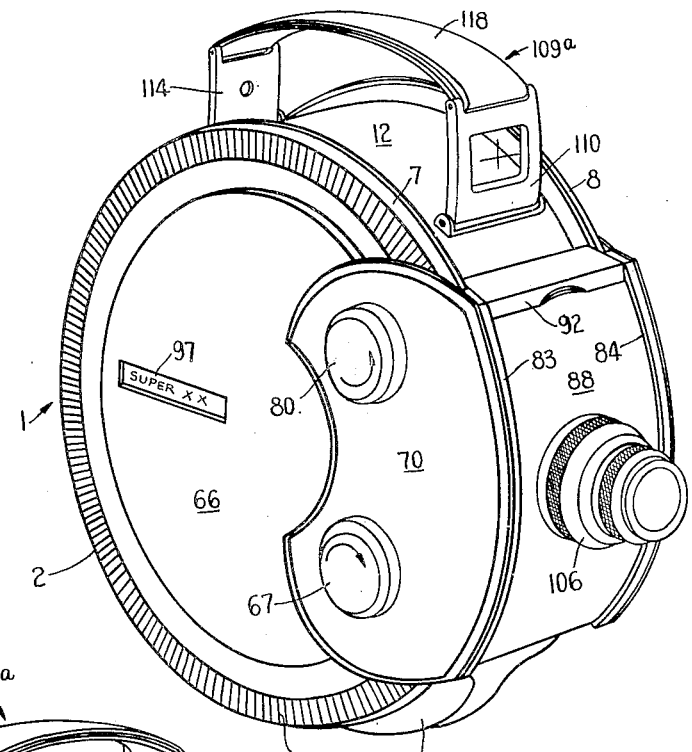
Figure 2:
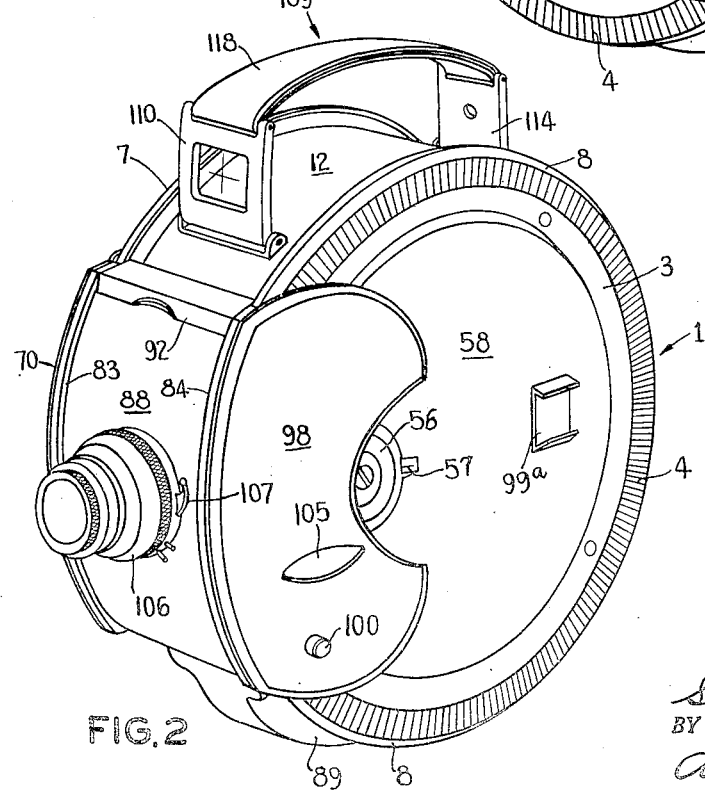
Figure 3:
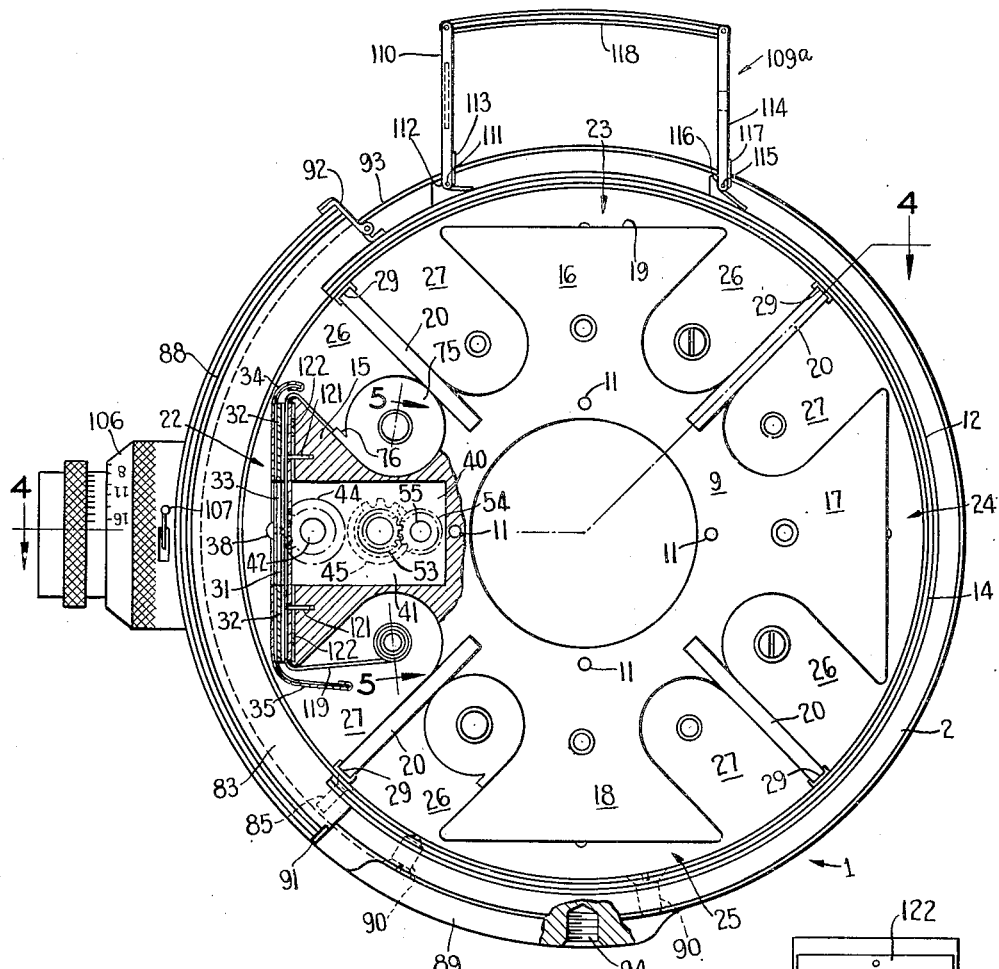
Figure 9:
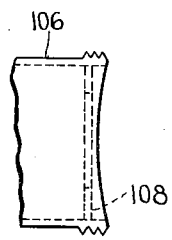
Figure 10:
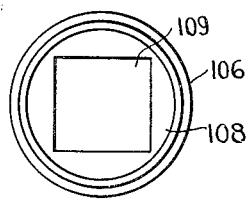
Figure 11:
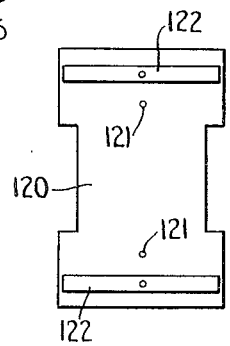

Figures 1 and 2 are views in perspective showing the external form and opposite sides of a camera having this invention, Fig. 3 is a view with one side wall removed and with certain parts broken away and in section to show internal construction, Fig. 4 is a view in section on the line 4—4 of Fig. 3, Fig. 5 is a detail view in section on the line 5—5 of Fig. 3, Fig. 6 is a detail view in section on the line 6—6 of Fig. 4, Fig. 7 is a detail side view of a latch means, Fig. 8 is a sectional view on line 8—8 of Fig. 7, Fig. 9 is a partial view of the lens case showing a light mask, Fig. 10 is an end view of the lens case and mask, and Fig. 11 is a detail view in rear elevation of a film pusher plate.

Referring to the drawings by characters of reference, the numeral 1 designates a hollow camera casing having circular side walls 2, 3 which may be knurled or ribbed adjacent their peripheries as at 4, to provide a hand or finger friction grip. The walls 2, 3 have concentric circular guideways or channels 5, 6 respectively in their inner facing surfaces and have their circumferential or marginal portions beveled or converging as at 7, 8 respectively to provide parallel circular trackways or rails. The side walls 2, 3 are spaced by and rigidly secured to an internal body member 9 by screws or the like 10 threaded in re-

2 cesses 11 (Fig. 3). Surrounding the member 9 which is of a generally Maltese cross form is an intermediate cylindrical wall portion 12 forming with the side walls the casing 1 of drum-like form. The wall portion 12 has its opposite side edges terminating in tenons or flanges 13, 14 which slidably fit in the channels 5, 6 respectively. The rabbeted or shouldered portions forming the flanges 13, 14 are offset as are the mating concentric portions of the inner faces of the side walls (see Fig. 4) so as to provide a light trap against leakage into the casing. The arms 15, 16, 17 and 18 of the body member 9 have substantially flat end faces 19, the end edges of which are rounded for film guiding, and terminate closely adjacent to the inner face of the cylindrical wall portion 12. Each of the arms is separated from the other by a partition member 20, integral with the body member 9, thereby providing four light sensitive material receiving compartments 22, 23, 24 and 25 of identical form. Each compartment contains two spool chambers 26, 27 which are separated from each other by the arms 15, 16, 17 and 18 in their respective compartments. Each of the adjacent chambers 26, 27 of different compartments is separated from the other by the partition members 20 which project slightly from the side faces of the body member 9 to fit and seat in radial recesses 28 formed in the side wall members 2, 3 and which terminate at the wall portion 12. The joints between the partition member ends and the wall portion 12 are preferably sealed by a felt or similar material strip 29. The cylindrical wall portion 12 has a length sufficient to close or cover all but one of the compartments, such that in the position of Fig. 3 its ends terminate in overlapping or closing relation to the spaced end faces of the partitions 20 enclosing the compartment 22, thereby leaving an access opening or doorway to the compartment interior.

The arm 15 has its top and bottom faces substantially parallel to the adjacent partitions 20 so that each film spool chamber has parallel side walls. In the arm and face there is a shallow channel extending between the chambers and forming a film guideway 30 with side webs or flanges 31. Closing the open side of the guideway 30, there is a plate member 32 having a light aperture 33 centrally of and extending from side to side of the guideway, the aperture having the dimensions of the film portion to be exposed. Overlying the member 32, there are upper and lower light shielding members 34, 35 respectively which are of thin sheet material carried by leaf springs 36, 37 in parallel overlying relation to the channel flanges 31, 31. The springs 36, 37 and the plate member 32 are secured to the arm 15 by screws 38 extending through the mid-portions of the springs so that the ends of the springs and the guide members can be flexed outwardly to clear or open the entrances to the chambers 26, 27 respectively. The guide members may be secured to the springs by having their marginal portions bent therearound, as at 39.

In the arm 15 there are parallel slots 40, 41, one adjacent each flange 31 and opening into the channel 30. Extending transversely through the slots 40, 41 there is a shaft 42 journaled in a cylindrical recess or bearing in the arm and carrying sprocket wheels 43, 44 fixed thereon. The sprocket teeth project into the channel 30 for cooperation with the film side edge perforations so that the shaft 42 will be rotated as the film is advanced. Meshing with the sprocket 43 is a sprocket wheel 45 fixed on a shaft 46 journaled in a cylindrical bearing or recess which opens at one end into a chamber 47 partially in the arm 15 and partially in the wall 2. Fixed on the end of the shaft 46 within the chamber 47 is a disc 48 carrying a stop pin or member 49 which is engageable with a stop bar or member 50 slideable transversely to stop pin movement on guide rods 51 fixed in the side wall 2. Springs 52 on the rods 51 urge the bar 50 into the path of the pin 49 and against the body arm 15. Fixed on the opposite end portion of the shaft 46 within the slot 41 there is a gear wheel 53 which meshes with a gear wheel 54 in the slot 41 and fixed on a stub shaft 55 journaled in the arm 15 and projecting through an aperture in the wall 3. There is a dial plate 56 marked with indicia of the number of film exposures, preferably one line for each exposure, which is fixed on the external end of the shaft 55. A finger or pointer 57 carried by a cover plate 58, to be described, cooperates with the exposure indicia. The gear wheel 53 has say thirty-six teeth, one for each exposure whereas the wheel 54 has one less tooth, so that the dial plate will be advanced one dial marking for each new exposure.

The stop bar 50 has an end aperture which rotatably fits a film winding rod of shaft 59 having a collar 60 engageable with the bar 50 to lift or move it against the force of springs 52 and out of the path of pin 49 so that the film can be advanced. The shaft 59 has a splined end portion 61 reciprocal longitudinally in a mating recess in the end of a film winding arbor 62 which has the usual film end receiving slot 63. The other end of the arbor 62 is carried by a screw 64 journaled in the side wall 3. The shaft 59 extends through the wall 2 and is frictionally held by a washer 65 of rubber or elastomeric material cemented to the wall 2. The shaft 59 terminates, at its outer end, short of a cover plate 66 and is received with a screw-threaded engagement in a finger grip knob 67 having a stop flange 68. The knob 67 is reciprocal and rotatable in an aperture 69 through the cover member 66 and its supporting wall member 70. The members 66 and 70 are recessed as at 71 to provide a stop shoulder for abutment by the flange 68, the recess having sufficient depth so that the knob 67 can be removed from the shaft 59. The chamber 26 has in the wall 3 a slot 72 parallel to the partition 20 and leading centrally inward from the chamber entrance. Opposite the inner end portion of the slot 72, there is a stub shaft 73 having a slotted end 74 to receive the fin or cross member of the arbor in a film cartridge 75 of the common can type having a light-sealed feed opening 76. The other arbor end 77 is received in the slot 72. The shaft 73 is of reduced cross-section such that the slotted end 74 forms a head reciprocal into a cylindrical recess 78 providing a shoulder engageable with the head to limit retraction of the shaft, the recess being of sufficient depth so that the head can move completely thereinto. On the exterior end of the shaft 73, which is screw-threaded, there is a friction washer 79 cemented to the wall 2 and of rubber or elastomeric material which resists rotation and inward movement of the shaft 73. Removably screw-threaded on the shaft 73, there is a knob or finger grip member 80 having a flange 81 retractible into a recess 82 in the supporting and cover members 66 and 70. The recess 82 is of a depth to permit removal of the knob from the shaft, while the shoulder engages the knob flange 81 to limit complete removal of the knob from the camera structure. The knob 80 is used to rewind the exposed film into the cartridge casing 75.

Each of the compartments 23, 24 and 25 is provided with film winding and supporting structure and indicator mechanism identical with that described for compartment 22.

Riding on the V-like rails 7 and 8, there are slide members 83, 84 respectively, which are of arcuate form and extend beyond or overlap the end portions of the cylindrical wall portion 14. The slide members 83, 84 are secured to the end portions of wall portion 14 by screws 85. In the inner face of each slide member there is a groove track, designated 86, 87 respectively, which receive the edge flanges or tenons of a curved door or closure member 88 for the compartment 22 and any of the other compartments 23, 24 or 25, as desired. The closure member 88 extends from end to end of the slide members 83, 84 and therefore overlaps the top and bottom ends of that compartment with which it is in cooperable relation. The space between the closure member 88 and the wall portion 14 is closed at its lower end by a camera supporting and hand grip member 89 which is secured to the wall portion 14 by screws 90. A felt pad 91 may be used to seal the joint. The upper end space between wall portion 14 and member 88 is closed by a latch member 92 which is pivoted at 93 on the wall portion 14. When the latch member 92 is bent or swung back against the wall portion 14, the cover member 88 will clear it for free sliding thereover. The grip member 89 may have a screw-threaded socket 94 by which the camera can be mounted on a support or tripod. The supporting plate 70 is secured to the slide member 83 by screws 95. The cover plate 66 is circular and has a marginal inturned flange 96 which slidably engages the side wall 2 which is centrally recessed. The plate 66 serves to cover or hide the ends of the arbor winding shafts which are not in use and also serves as an indicator of the compartment or film which is lined up with the closure member 88. Through the plate 66 there is a window or slot 97 through which indicia on the wall 2 is visible, the indicia preferably designating kinds of film. The cover plate 56 is carried by a supporting member 98 which is secured to the slide member 84 by screws 99 and which has an inturned marginal flange which slidably fits the recessed portion of the wall 3, thereby housing and shielding the various dial plates 56. A bracket 99a on the plate 58 is preferably provided to support a range finder, not shown. The closure structure including supporting plates 70 and 98 is held in desired relation to a particular compartment by a latch device (Figs. 7 and 8) having a button 100 projecting through an aperture in the supporting member 98 and pivoted to a lever 101 pivotally supported on the member 98. On the free end of the lever 101, there is a detent or dog 102 cooperable with a plurality of sockets 103 into each of which it is urged by a spring 104, there being one socket for each compartment. A finger grip 105 projects from the supporting member 98.

Carried by the closure member 88, there is a lens and shutter mechanism housing 106 which seats and is secured in a light aperture through the member 88. The housing 88 contains the usual diaphragm or iris, shutter and lens, and has the usual shutter release 107. The housing 106 contains a mask 108 having a light aperture 109 which limits the pencil of light rays to the film portion which is to be exposed.

A combined view finder and camera carrying member is designated 109$^a$ and is mounted on the wall portion 14. The front sight member 110 is pivoted at 111 and held upright against a stop shoulder 112 by a spring 113. The rear sight member 114 is pivoted at 115 and likewise urged against a stop shoulder 116 by a spring 117. The sight members are rigid and interconnected by a cross-member 118 which is pivoted to each of the upright sight members. It will be apparent that the members 110 and 114 when bent or pivoted backward to be against the wall portion 14 will permit the closure member 88 to move freely thereover.

The operation of this camera is as follows: With the parts cooperatively arranged as shown in the several figures, the camera is adjusted for exposure or picture taking in the usual manner, that is, after sighting the object through the view finder 109$^a$ with its cross-hairs on the finder lens of support 110, the shutter speed and diaphragm opening having been adjusted, the shutter is operated by the lever release 107, thereby exposing the light aperture alined portion of the film 119. In order to move the film to the next unexposed frame or portion, the knob 67 is pulled out sufficiently to release the pin 49 from opposing relation to the bar 50, then the knob 67 is rotated clockwise as indicated by the arrow, Fig. 1. After, say, fifteen degrees of knob rotation, sufficient for the pin 49 to clear the bar 50, the knob 67 is pushed inward to place the bar 50 again in the path of stop pin 49 and the rotation of the knob is continued until stopped by the pin 49 again coming up against the bar 50 as in Figs. 5 and 6. The pulling of the film 119 over the sprocket wheels 43, 44 by the rotating arbor 62, serves to rotate the shaft 46 through the sprocket gearing 43, 45 which rotates the pin 49. The shaft 46 also rotates the gear wheel 53 which, through the gear 54, drives the indicator shaft 55 to rotate the dial plate 56, bringing its next mark or line into registry with the pointer 57. The film is now positioned for the next exposure. When all of the film has been exposed, it can be rewound into the cartridge case 75 by rotation of the knob 80 in a counter-clockwise direction, as indicated by the arrow, after first retracting the bar 50 from the path of pin 49 as above described. It is unnecessary, however, and the camera is particularly adapted for making possible the single or multiple exposure of the film frames of the film 119 in alternation with the film contained in any and all of the compartments 23, 24 and 25. If this is desired, it is accomplished as follows: The knobs 67 and 80 are unscrewed from their respective shafts 59 and 73 and retracted into their recesses 71 and 82. The button 100 is now depressed to bring the dog 102 out of its notch 103. The cylindrical wall portion 14 can now be rotated relative to the side walls, 2, 3 by grasping the knurled rims 4 with one hand and the side supports and grip 105 with the other hand. Upon registry of the lens structure with the next adjacent compartment, either 23 or 25, the latch dog 102 will snap into its next recess or notch. The knobs 67 and 80 are now screwed onto their alined new film winding shafts, similar to the shafts 59 and 73 respectively, and the camera is now ready for operation with the film of the new compartment as above described for compartment 22. Loading of the compartments is accomplished by swinging the latch 92 backward against the wall portion 14 and sliding the closure member 88 upward in its trackways in the supporting members 70 and 98, the view finder structure 109$^a$ collapsing by the pressure of the member 88 thereagainst. When the closure member 88 has been moved to the upper end of its trackways, the compartment 22 is open for the removal or insertion of the cartridge case 75 with its exposed or new film, after retraction of the knob 80. The resilient shielding plates 34 and 35 must, of course, be flexed outward to open the entrances to the chambers 26 and 27 when reloading, and the plate 34 retracted when unloading. Upon loading, the film is manually guided into and fed through the channel 30 and has its free end engaged in the arbor slot 63 as is well known. After closure of the cover member 88 and relatching of the latch member 92, the newly inserted film, after proper winding, is ready for exposure. Each of the compartments can be loaded and unloaded as above described for the compartment 22.

A film presser or pusher plate 120, Fig. 11, is preferably provided in each of the body member arms. The plates 120 lie in rectangular recesses beneath the film and are notched at their side edges to clear the sprocket wheels. Each plate is reciprocally supported by a plurality of guide pins 121 reciprocal in body member cylindrical bores and each is urged outward by a pair of leaf springs 122 secured thereto. The springs 122 urge the plates against the film and the film against the light aperture plate members 32 so as to hold the film flat.

It will be apparent that the internal body member 9 may be made with other than four film receiving chambers. There might, for example be, say, two or three chambers or even five or six instead of the four as shown.

Having thus described the invention, what is claimed and desired to be secured by Letters Patent is:

1. A camera comprising a hollow casing having spaced side walls joined by an intermediate cylindrical wall portion, an internal body member rigidly connecting said side walls and having a plurality of compartments, means light-sealing said compartments from each other, means supporting said wall portion for rotary movement relative to said body member, said wall portion having an opening for access to said compartments upon said relative rotary movement, a closure member for said opening, means including film feeding and receiving chambers in each compartment operable to support light sensitive film material, said last-named means being accessible through said opening for insertion and removal of the film material, and light aperture means to expose selectively said material.

2. A camera comprising a hollow casing having spaced side walls joined by an intermediate cylindrical wall portion, an internal body member rigidly connecting said side walls and having a plurality of compartments, means light-sealing said compartments from each other, means supporting said wall portion for rotary movement relative to said body member, said wall portion having an opening for access to said compartments upon said relative rotary movement, a closure member for said opening, means including film feeding and receiving chambers in each compartment operable to support light sensitive film material, said last-named means being accessible through said opening for insertion and removal of the film material, means carried by said wall portion to lock said body member against movement relative thereto, and light aperture means to expose selectively said material.

3. A camera comprising a hollow casing having spaced side walls joined by an intermediate cylindrical wall portion, an internal body member rigidly connecting said side walls and having a plurality of compartments, means light-sealing said compartments from each other, means supporting said wall portion for rotary movement relative to said body member, said wall portion having an opening for access to said compartments upon said relative rotary movement, a closure member for said opening, shutter-controlled light aperture means carried by said closure member, and means including film feeding and receiving chambers in each compartment operable to support light-sensitive film material in position to receive light through said aperture means, said opening permitting access to said chambers.

4. A camera comprising a hollow casing having spaced side walls joined by an intermediate cylindrical wall portion, an internal body member rigidly connecting said side walls and having a plurality of compartments, means light-sealing said compartments from each other, means supporting said wall portion for rotary movement relative to said body member, said wall portion having an opening for access to said compartments upon relative rotary movement, a closure member for said opening, track means carried by said wall portion at said opening, means slideably mounting said closure member on said track means, means in each compartment operable to support light-sensitive material, and light aperture means to expose selectively said material and carried by said closure member.

5. A camera comprising a hollow casing having spaced side walls joined by an intermediate cylindrical wall portion, an internal body member rigidly connecting said side walls and having a plurality of compartments, means light-sealing said compartments from each other, means supporting said wall portion for rotary movement relative to said body member, said wall portion having an opening for access to said compartments upon said relative rotary movement, a closure member for said opening, roll film supporting means in each compartment and including a film winding arbor accessible through said opening upon said rotary movement, a winding grip member supported by said wall portion, means operatively to connect said grip member separately to said arbors, and a single light aperture means cooperable selectively with said compartments.

6. A camera comprising a hollow casing having spaced side walls joined by an intermediate cylindrical wall portion, an internal body member rigidly connecting said side walls and having a plurality of compartments, means light-sealing said compartments from each other, means supporting said wall portion for rotary movement relative to said body member, said wall portion having an opening for access to said compartments upon said relative rotary movement, a closure member for said opening, roll film supporting means in each compartment and including a film winding arbor accessible through said opening upon said rotary movement, a winding grip member supported by said wall portion, means operatively to connect said grip member separately to said arbors, means to limit rotation of said grip member, means operable by said grip member to release said limiting means, and a single light aperture means cooperable selectively with said compartments.

7. A camera comprising a hollow casing having spaced side walls joined by an intermediate cylindrical wall portion, an internal body member rigidly connecting said side walls and having a plurality of compartments, means light-sealing said compartments from each other, means supporting said wall portion for rotary movement relative to said body member, said wall portion having an opening for access to said compartments upon said relative rotary movement, a closure member for said opening, roll film supporting means in each compartment and accessible through said opening and including a film winding arbor, a winding grip member supported by said wall portion, means operatively to connect said grip member separately to said arbors, indicator means operable by film movement, means operable by said indicator means to limit rotation of said grip member, means operable by said grip member to release said limiting means, and a single light aperture means cooperable selectively with said compartments.

8. A camera comprising a hollow casing having spaced side walls joined by an intermediate cylindrical wall portion, an internal body member rigidly connecting said side walls and having a plurality of compartments, means light-sealing said compartments from each other, means supporting said wall portion for rotary movement relative to said body member, said wall portion having an opening for access to said compartments upon said relative rotary movement, a closure member for said opening, roll film supporting means in each compartment and accessible through said opening and including a film winding arbor, a winding grip member supported by sail wall portion, means projecting through one of said side walls operatively to connect said grip member separately to said arbors, a shield member carried by said wall portion and housing said last-named means and having an aperture therethrough for viewing indicia carried by one of said side walls, and a single light aperture means cooperable selectively with said compartments.

9. In a camera, a hollow casing having a light-sensitive material receiving compartment, said casing having an opening for access to said compartment, track means carried by said casing, a closure member for said opening and slideably supported by said track means, a view finder carried by said casing in the path of movement of said closure member, and means movably supporting said finder for movement out of the path of said closure member upon engagement of said finder by said closure member.

10. A camera comprising a hollow casing having a film receiving compartment containing spaced spool chambers, sprocket mechanism supporting structure within said compartment and separating said chambers and having a film guide channel connecting said chambers, a plate member having a light aperture therethrough and extending from end to end of and seating upon the side flanges of said channel, said plate member being operable to hold the film flat, a shielding means overlying said plate member and having a light aperture registering with said plate member aperture, said shielding means having movable end portions extending beyond the adjacent edges of the spool chamber entrances, means supporting said shielding means for movement of said portions out of obstructing relation to said entrances, said casing having an opening for access to said compartment and said chambers, a closure member for said last-named opening and having a light admitting aperture registering with said registering apertures, and shutter means carried by said closure member and controlling light flow through said light admitting aperture.

11. A camera comprising a hollow casing having a film receiving compartment containing spaced spool members, sprocket mechanism supporting structure within said compartment and separating said chambers and having a film guide channel connecting said chambers, a plate member having a light aperture therethrough and extending from end to end of and seating upon the side flanges of said channel, said plate member being operable to hold the film flat, a spring-pressed presser plate carried by said structure and urged toward said plate member so as to flatten the film against said plate member, a shielding means overlying said plate member and having a light aperture registering with said plate member aperture, said shielding means having movable end portions extending beyond the adjacent edges of the spool chamber entrances, means supporting said shielding means for movement of said portions out of obstructing relation to said entrances, said casing having an opening for access to said compartment and said chambers, a closure member for said last-named opening and having a light admitting aperture registering with said registering apertures, and shutter means carried by said closure member and controlling light flow through said light admitting apertures.

12. A camera comprising a hollow casing having a film receiving compartment with spaced spool chambers, sprocket mechanism supporting structure separating said chambers and having a film guide channel connecting said chambers, a sprocket wheel shaft extending transverse to said channel and supported in said structure, spaced sprocket wheels on said shaft and extending into said channel adjacent the side edges thereof, a plate member having a light aperture therethrough and extending from end to end of and seating upon the side flanges of said channel, said plate member being operable to hold the film flat and in engaging relation to said wheels, a shielding means overlying said plate member and having a light aperture registering with said plate member aperture, said shielding means having movable end portions extending beyond the adjacent edges of the spool chamber entrances, means supporting said shielding means for movement of said end portions out of obstructing relation to said entrances, said casing having an opening for access to said compartment and said chambers, a closure member for said last-named opening and having a light admitting aperture registering with said registering apertures, and shutter means carried by said closure member and controlling light flow through said light admitting aperture.

13. A camera comprising a hollow casing having spaced parallel circular side walls and an intermediate cylindrical wall portion joined to said side walls, said walls and wall portion having cooperable tongue and groove connection for relative rotary movement therebetween, said side walls extending beyond said wall portion to provide trackways, a body member within said wall portion and rigidly connecting said side walls, said body portion being of general Maltese cross form and having radial partition members intermediate each of the cross arms, said partition members providing compartments and interlocking with said side walls and having a substantially sliding fit with said wall portion to light-seal said compartments, a pair of shafts journaled in each of said arms, each of said arms having a pair of recesses spaced longitudinally of said shafts and opening through the end faces of said arms, film engaging sprocket wheels mounted on one of each pair of shafts and having its teeth projecting from its recess, a cooperable sprocket wheel on each of the other shafts for rotation of each other shaft by its one shaft, stop members carried one by each of said other shafts, a plurality of releasable detent bars cooperable one with each stop member, film winding arbors rotatably supported one in each compartment, shaft members having relatively longitudinally slideable and rotary driving engagement, one with each said arbor, means operable by sliding movement of said shaft members to actuate said detent bars to release said stop members, means opposing reverse rotation of said shaft members, film spool supporting means in each compartment on the opposite side of its arm from the arbor and including a plurality of shaft members, all of said shaft members extending through and being journaled in one of said side walls, said wall portion having a compartment access opening extending between two adjacent partition members and from side wall to side wall, arcuate track members carried by said wall portion and being slideable on said trackways, a closure member mounted between and slideable on said track members for opening and closing said access opening, a lens and shutter means registering with an aperture in and carried by said closure member, a combined latch and light-sealing member to hold said closure member against opening movement, a combined view finder and carrying handle member carried by said wall portion in the path of movement of said closure member, means collapsibly supporting said handle member for movement out of the path of said closure member, said closure member upon its opening movement engaging said handle member and being operable to move said handle member out of its said path, a shield member for each outer side wall face and housing the ends of said shaft members, a pair of hand grip members rotatable and reciprocal in one of said shield members, said grip members being positioned for alignment with any one of the pairs of shaft members and being clutchable therewith for driving said arbors and said spools and means carried by said wall portion and cooperable with one of said side walls to lock said side walls and wall portion against movement relative to each other.

SAMUEL NOBLE.

REFERENCES CITED

The following references are of record in the file of this patent:

UNITED STATES PATENTS

| Number | Name | Date |
|---|---|---|
| 1,902,869 | Lathe | Mar. 28, 1933 |
| 1,987,041 | Wood | Jan. 8, 1935 |
| 2,245,606 | Rauch | June 17, 1941 |
| 2,439,112 | Teague | Apr. 6, 1948 |